US011681396B2

(12) United States Patent
Hansen

(10) Patent No.: US 11,681,396 B2
(45) Date of Patent: Jun. 20, 2023

(54) OPTICAL INPUT DIODES

(71) Applicant: Panasonic Automotive Systems Company of America, Division of Panasonic Corporation of North America, Peachtree City, GA (US)

(72) Inventor: Nicholas Brian Hansen, Fayetteville, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 44 days.

(21) Appl. No.: 17/549,927

(22) Filed: Dec. 14, 2021

(65) Prior Publication Data

US 2022/0206601 A1 Jun. 30, 2022

Related U.S. Application Data

(60) Provisional application No. 63/132,730, filed on Dec. 31, 2020.

(51) Int. Cl.

*G09G 3/36* (2006.01)
*G06F 3/042* (2006.01)
*G02F 1/13357* (2006.01)
*G06F 3/033* (2013.01)

(52) U.S. Cl.

CPC ........ *G06F 3/042* (2013.01); *G02F 1/133615* (2013.01); *G02F 1/133617* (2013.01); *G06F 3/033* (2013.01)

(58) Field of Classification Search

CPC .............. G06F 3/042; G02F 1/133615; G02F 1/133617; G09G 3/36–3696

See application file for complete search history.

(56) References Cited

U.S. PATENT DOCUMENTS

2003/0063106 A1* 4/2003 Starkweather ....... G09G 3/2003 345/690
2013/0063471 A1* 3/2013 Sugiyama ........... G09G 3/3406 345/589

* cited by examiner

*Primary Examiner* — Sanghyuk Park
(74) *Attorney, Agent, or Firm* — Laurence S. Roach, Esq.

(57) ABSTRACT

Examples of the present disclosure relate to a device, method, and system for optical input diodes. A liquid crystal display (LCD) backlight device may include a processor and a color filter of a pixel including at least one of a red filter, a green filter, or a blue filter. The LCD backlight device may also include a diode to emit light through the color filter in response to being driven by the processor. The diode may generate a voltage in response to light passing through the color filter and arriving on the diode, where an image value may be calculated as a function of the voltage generated and a color filter value of the color filter.

20 Claims, 8 Drawing Sheets

200

300

400

500

600

700

800

OPTICAL INPUT DIODES

CROSS-REFERENCED TO RELATED APPLICATIONS

This application claims the benefit of U.S. Provisional Application No. 63/132,730, filed on Dec. 31, 2020, the disclosure of which is hereby incorporated by reference in its entirety for all purposes.

FIELD OF THE INVENTION

The present disclosure generally relates to a method, system, and device for obtaining optical input through diodes also used for emitting light. More specifically, the present disclosure relates to using light emitting diodes (LEDs) for both light emission and also for detection of image input.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

A liquid crystal display (LCD) can include a backlight and separate backlighting circuit. The backlight may be an array of light emitting diodes (LEDs). The LEDs can fill the entire area of the LCD. The rows of LEDs to the sides of the LCD can also project light through the LCD display area by a film that transmits and channels the LED light input. The use of the LED and the LCD can together enable the optical output and display of images. A heads up display (HUD) may include an LCD with an LED backlight or array of LEDs serving as a backlight.

SUMMARY

Generally, the present techniques relate to a device, method, and system for optical input diodes. A liquid crystal display (LCD) backlight device may include a processor and a color filter of a pixel including at least one of a red filter, a green filter, or a blue filter. The LCD backlight device may also include a diode to emit light through the color filter in response to being driven by the processor. The diode may generate a voltage in response to light passing through the color filter and arriving on the diode, where an image value may be calculated as a function of the voltage generated and a color filter value of the color filter.

The present techniques further include a method of identifying optical input from a diode including emitting light with a diode through a color filter and generating a voltage with the diode in response to light passing through the color filter and arriving on the diode. The method may also include calculating an image value as a function of the voltage generated and a color filter value of the color filter.

The present techniques also include a system of optical input diodes. The system includes a processor, a liquid crystal display (LCD), a light emitting diode (LED) backlight array, and a color filter of a pixel including at least one of a red filter, a green filter, or a blue filter. The system may also include a diode in the light emitting diode backlight array to emit light through the color filter in response to being driven by the processor, the diode to generate a voltage in response to light passing through the color filter and arriving on the diode, where an image value is calculated as a function of the voltage generated and a color filter value of the color filter.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
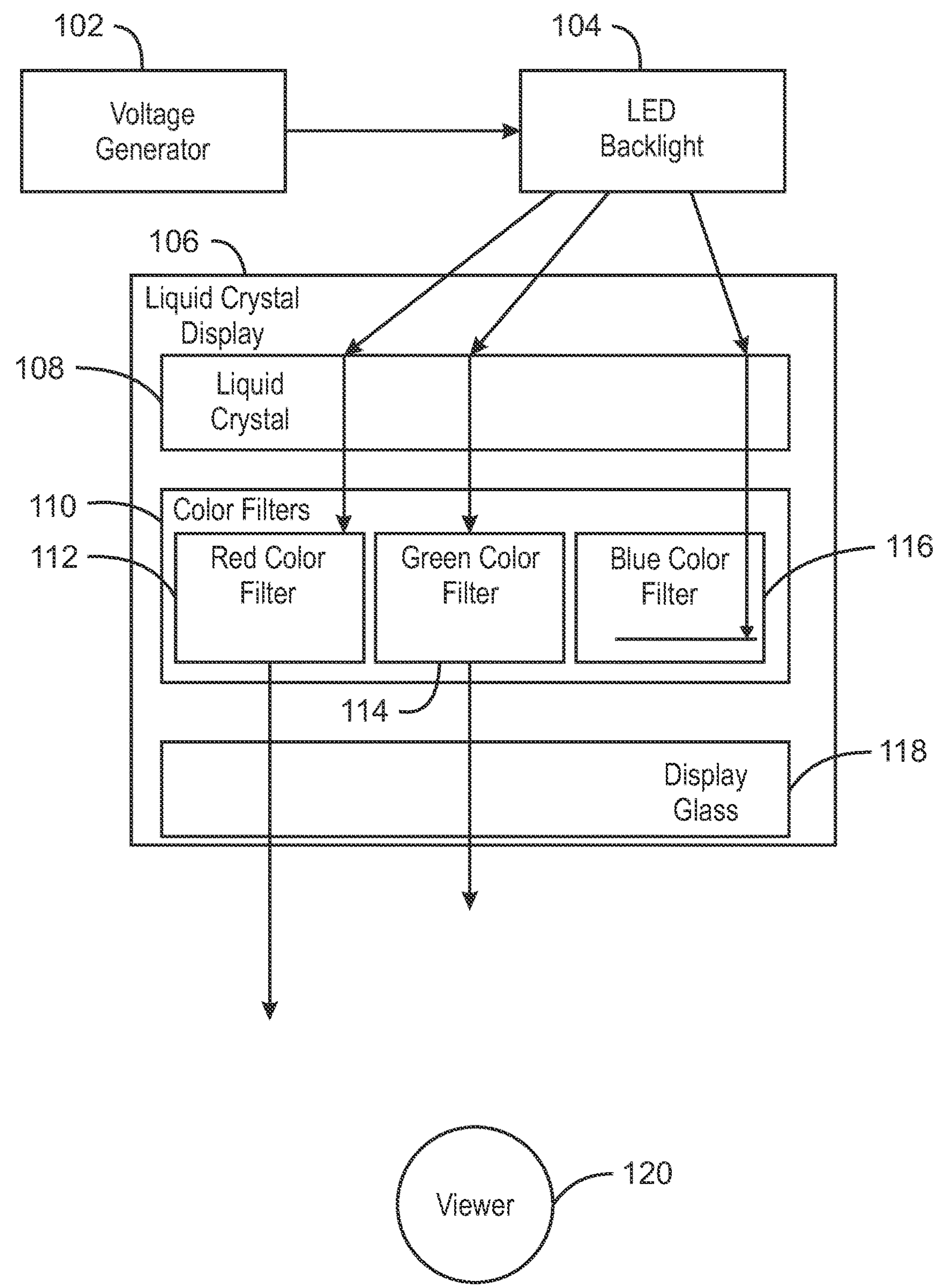
FIG. 1 is a block diagram of an example system for optical input diodes 100 during an output phase of operation.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

When light emitting diodes (LEDs) are used, for example to backlight an LCD, the LEDs can be arranged in an array behind the screen or in arrays at the edges of the screen. For LEDs arranged in arrays at the edge of a screen, optical films can be used to diffuse the light and to create a uniform illumination of an image on the LCD. The present disclosure relates to how an LCD display with diodes for backlights can also be used as an optical input. In an example, the LEDs and optical films can be employed in a reverse manner, where each diode is considered a voltage source when exposed to an external light source. Using the voltage generating function of an LED, the amount of light available to travel back through the liquid crystal and the associated color filters can be estimated. These estimations can be informed by the voltage across an LED or array of LED's when they are not being driven to illuminate the displayed image.

Several measurements can be used to interpret an image being captured by an LCD screen. A scanning sequence of red, blue, and green subpixels can be employed to estimate the amount of light containing each of the composite wavelengths is entering through the LCD in a given area. Measuring the total voltage generated by the light passing through the LCD before and after the activation of each subpixel allows for the estimation of the light that passed through the subpixel in question.

Currently optical inputs for electronic systems require separate cameras. This influences the packaging options for the system. Utilizing the LCD screen that is often present in an electronic system as an optical input device could allow for a much smaller form factor and possibly a reduction in cost due to a reduction in component count. An image can still of course be captured through the use of a traditional camera configuration, however the use of the additional components raises the cost of the product and increases the package size.

The present disclosure also shows how multiple "banks" of LED's can measure distance independently and use intersections of distances and triangulation to gather additional location information about the image being captured by the screen. This triangulation method in itself may indicate if a user is directing a light source at the screen and using the light source as a pointer.

FIG. 1 is a block diagram of an example system for optical input diodes 100 during an output phase of operation. Arrows in this diagram can be used to show a general direction of action. However, this is a simplified representation and is used to illustrate an example aspect of operation.

The system for optical input diodes 100 can include a voltage generator 102 to generate a voltage. In an example, the voltage generator may be a battery, capacitor, electrical generator, or other source of power that can drive a display. The voltage may be carried to a light emitting diode (LED) backlight 104. The LED backlight 104 may be shown here as a single block, however, a number of various configurations of LEDs are possible. In an example, the LEDs may be arranged in a grid-like array and span the entirety of a display. In an example, the LEDs may be arranged at an edge or multiple edges of a display with light being emitted from the LEDs and guided towards an output of the display through a film, substrate, glass, or other optical element for guiding light to cover the area intended to be lit by the LED backlight.

Diodes are semiconductors which primarily allow current to flow in one direction. Light emitting diodes can emit light when current passes through its terminals in response to a voltage being applied across the terminals of the diode. Photons arriving at the diode can generate a small, but non-zero voltage across the terminals of the light emitting diode. As this voltage may be less than a voltage applied across the diode terminals to produce light, detection of voltage resulting from incoming light may be detected during a time period when a current is not being driven to the diode. Accordingly, the same diode may be used for both light output and for detection of input. In an example, a diode used for input of optical wavelengths may have multiple phases, such as alternating between an input and an output phase. As seen in the system for optical input diodes 100, the diodes used in the LED backlight 104 may operate in an output phase by emitting light through a liquid crystal display 106.

During emission of light from the LED backlight 104 through the liquid crystal display 106, the light may pass through liquid crystal 108 as well as color filters 110 including a red color filter 112, a green color filter 114, or a blue color filter 116. Each of the color filters may be controlled to allow a controllable percentage of light through in order to control the color output for a particular area. In an example, the area of a pixel may contain one of each of the red color filter 112, green color filter 114, and the blue color filter 116. In an example, these subdivisions may be referred to as sub-pixels, such as a red subpixel, green subpixel, and blue subpixel.

The color filters 110 may be adjusted individually to allow fractions of that particular color to be illuminated by the light coming from the LED backlight 104. For example, as seen in FIG. 1, the light emitted from the LED backlight 104 may travel through the liquid crystal display 106, through the color filters 110, then the display glass 118 on its way to a viewer 120. The color filters 110 may be set so that one-hundred percent of the light can pass through the red color filter 112. The color filters 110 may be set so that fifty percent of the light can pass through the green color filter 114. The color filters 110 may be set so that no light can pass through the blue color filter 116. In this example, the pixel with these color filter settings may appear to be an orange pixel to the viewer 120. A function can be created relating the voltage applied to the diode and the detected output light relative to the setting of each color filter 110. A simplified expression of that function is seen below in Equation 1.

$$\text{Output } R \cong \text{Pass } R * V$$

$$\text{Output } G \cong \text{Pass } G * V$$

$$\text{Output } B \cong \text{Pass } B * V$$

Equation 1. Where V is the voltage input on the diode, where "Pass (R/G/B)" refers to a numerical value for the setting of a color filter for red, green, and blue, respectively, and where "Output (R/G/B)" refers to an output measure of the light for each of red, green, and blue respectively after the light has passed through the color filters 110 of a liquid crystal display.

Using the expression of Equation 1 and the example provided for FIG. 1, the one-hundred percent passage setting for the red color filter 112 would correspond to Output R≅1.0*V. Likewise, in the example provided for FIG. 1, the fifty percent passage setting for the green color filter 114 would correspond to Output G≅0.5*V. In the example provided for FIG. 1, the zero percent passage setting for the blue color filter 116 would correspond to Output B≅0.0*V. While Equation 1 is useful for calculating an output value, these values are also useful in determining incoming light when measuring a voltage detected with known color filter settings.

Figure 2:
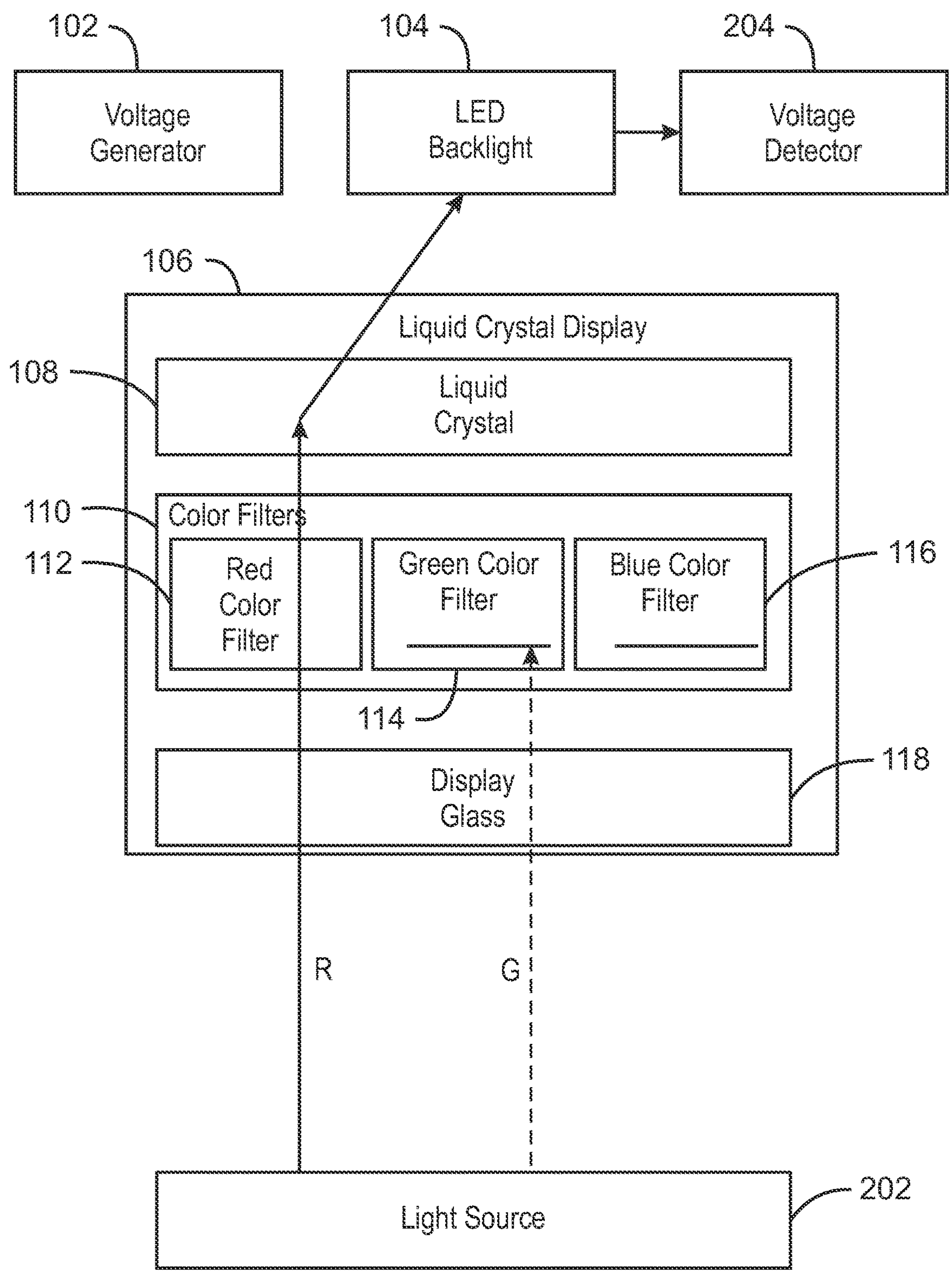
FIG. 2 is a block diagram of an example system for optical input diodes during an input phase of operation for a red color filter.

FIG. 2 is a block diagram of an example system for optical input diodes during an input phase of operation for a red color filter 200. Like numbered items are as described with respect to FIG. 1.

When the LED backlight 104 of an LCD 106 is not being driven by a voltage generator 102, the LEDs in the LED backlight 104 may serve as photodiodes for incoming light. Photodiodes convert incoming light into a detectable voltage. As seen here, a light source 202 may be sending light through the display glass, through at least one of the color filters 110, then through the liquid crystal 108 on its way to the LED backlight 104. As used herein, a light source may be a source of light that is generating the light itself or may be reflecting light from another source. In an example, the light source can be a physical object that is reflecting light from another light source in the same physical space or environment. In an example, the light source can be reflecting light that originated from a device electronically in a circuit or system connected to the LED backlight 104.

As the light arrives at the LED backlight 104, the light received at a diode may be converted into a voltage that is detected by a voltage detector 204. In an example, the voltage detector 204 may be a separate piece of hardware connected in an electrical signal path between the LED where the light arrives and a processor. The processor may use a reading from the voltage detector 204 to identify an image color and value incoming from the light source 202.

In an example shown in FIG. 2, the light source may be generating or reflecting an orange colored light included of red light, a fraction of green light, and no blue light. In the example shown in FIG. 2, the color filters 110 are set to isolate for red light by leaving the red color filter 112 open, while blocking light transmission through the green color filter 114 and the blue color filter 116. In this example, the light from the light source 202, which is orange light included of red and green light, travels through the display glass and color filters 110, and only red light is able to pass through. The red light reaches the diodes in the LED backlight 104 and generates a voltage relative to saturation value of the color being emitted by the light source 202. An example of this calculation can be approximated by applying Equation 2 and solving for a voltage corresponding to incoming R light, or $V_R$.

$$V_R \cong \text{Source } R * \text{Pass } R$$

Equation 2—where Source R corresponds to the saturation value of the red light coming from a light source 202 and where Pass R corresponds to a percentage of light allowed to pass through a particular color filter, in this case the red color filter. Applying this equation to the example described and shown in FIG. 2, where orange light is a light source, and the red color filter is allowing all light through, it is determined that:

$$V_R \cong \text{Source } R * \text{Pass } R$$

$$V_R \cong 1*1$$

$$V_R \cong 1$$

In this example, we can deduce from the voltage corresponding to the incoming R light to be a value that corresponds to a light source 202 that is sending light that has a red component that is fully saturated, or a value that corresponds to 1. To determine the color of the light source 202, further scans can be done with different color filters open as seen in FIG. 3.

Figure 3:
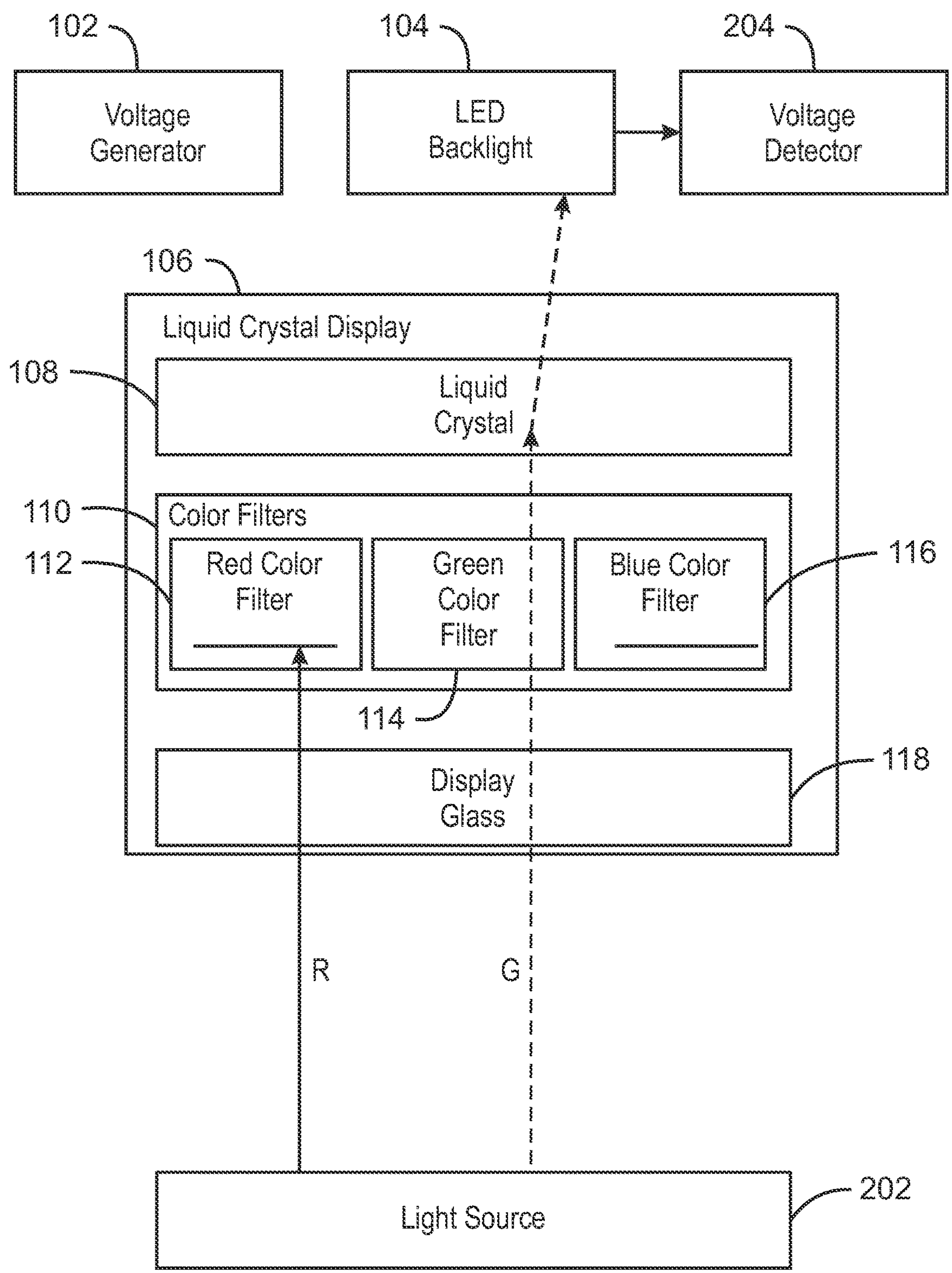
FIG. 3 is a block diagram of an example system for optical input diodes during an input phase of operation for a green color filter.

FIG. 3 is a block diagram of an example system for optical input diodes during an input phase of operation for a green color filter 300. Like numbered items are as described with respect to FIGS. 1 and 2.

In an example shown in FIG. 3, the light source 202 is still an orange light source included of red light, a fraction of green light, and no blue light. In the example shown in FIG. 3, the color filters 110 are set to isolate for green light by leaving the green color filter 114 open, while blocking light transmission through the red color filter 112 and the blue color filter 116. In this example, the light from the light source 202, which is orange light included of red and green light, travels through the display glass and color filters 110, but only green light is able to pass through as the red color filter is closed. The green light reaches the diodes in the LED backlight 104 and generates a voltage relative to saturation value of the color being emitted by the light source 202. An example of this calculation can be approximated by applying Equation 3 and solving for a voltage corresponding to incoming G light, or $V_G$.

$$V_G \cong \text{Source } G * \text{Pass } G$$

Equation 3—where Source G corresponds to the saturation value of the green light coming from a light source 202 and where Pass G corresponds to a percentage of light allowed to pass through a particular color filter, in this case the green color filter. Applying this equation to the example described and shown in FIG. 3, where orange light is a light source, and the green color filter is allowing all light through, it is determined that:

$$V_G \cong \text{Source } G * \text{Pass } G$$

$$V_G \cong 0.5*1$$

$$V_G \cong 0.5$$

In this example, we can deduce from the voltage corresponding to the incoming G light to be a value that corresponds to a light source 202 that is sending light that has a green component that is saturated with a value that corresponds to 50 percent saturation or 0.5 green light saturation. To determine the color of the light source 202, further scans can be done with the final filter open as seen in FIG. 4.

Figure 4:
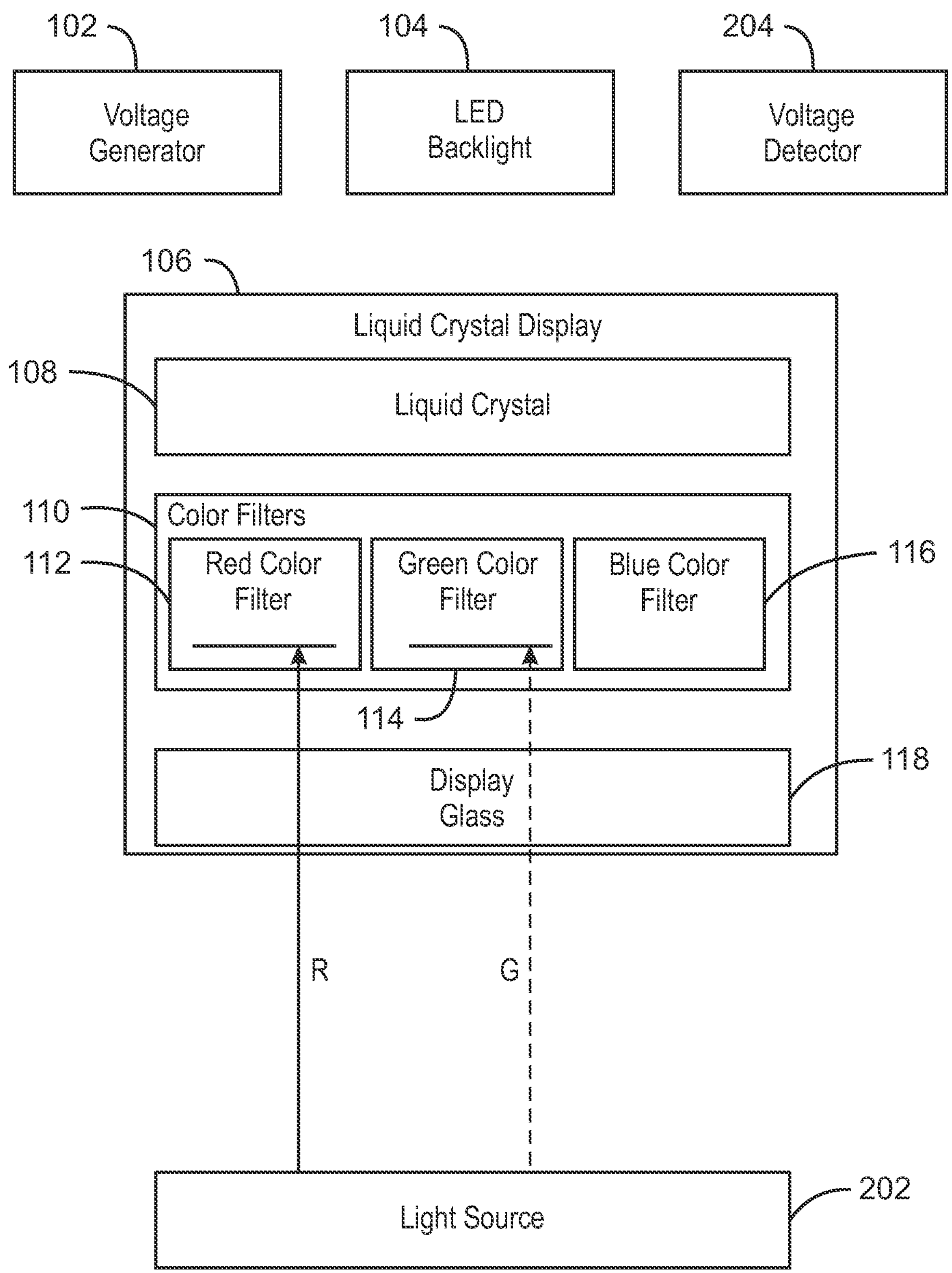
FIG. 4 is a block diagram of an example system for optical input diodes during an input phase of operation for a blue color filter.

FIG. 4 is a block diagram of an example system for optical input diodes during an input phase of operation for a blue color filter 400. Like numbered items are as described with respect to FIGS. 1 and 2.

In an example shown in FIG. 4, the light source 202 is still an orange light source included of red light, a fraction of green light, and no blue light. In the example shown in FIG. 4, the color filters 110 are set to isolate for blue light by leaving the blue color filter 116 open, while blocking light transmission through the red color filter 112 and the green color filter 114. In this example, the light from the light source 202, which is orange light included of red and green light, travels through the display glass and color filters 110, but are not able to pass through as their respective color filters are closed. As the example light source 202 is sending orange light, there is no component blue light that is sent through the LCD 106. An example of a calculation accounting for this absence can be approximated by applying Equation 4 and solving for a voltage corresponding to incoming B light, or $V_B$.

$$V_B \cong \text{Source } B * \text{Pass } B$$

Equation 4—where Source B corresponds to the saturation value of the blue light coming from a light source 202 and where Pass B corresponds to a percentage of light allowed to pass through a particular color filter, in this case the blue color filter. Applying this equation to the example described and shown in FIG. 4, where orange light is a light source, and the blue color filter is allowing all blue light through, it is determined that:

$$V_B \cong \text{Source } B * \text{Pass } B$$

$$V_B \cong 0.0*1$$

$$V_B \cong 0.0$$

In this example, we can deduce from the voltage corresponding to the incoming B light to be a value that corresponds to a light source 202 that is sending light that has a blue component that is saturated with a value that corresponds to 0 percent saturation or 0.0 blue light saturation.

Taking each of the examples of FIGS. 2, 3, and 4 together as separate scans of the same light source 202, it can be determined that the light source has 100 percent red light saturation, 50 percent green light saturation, and 0 percent blue light saturation. This information can be combined to determine that the light source 202 for the times scanned corresponds to an orange light source.

As a note, the voltage values calculated would have to additionally be calibrated relative to the ability of each LEDs ability to act as a photodiode. For example, some LEDs in an LED backlight 104 may not be able to generate a very high voltage from incoming light, while others may be more efficient and result in higher voltages generated for the same light. Accordingly the values calculated correspond to a saturation value for each color once a calibration factor is known for a particular diode.

Each pixel in an LCD may include three subpixels each corresponding to a different color filter. As seen in FIGS. 2-4, each of these color filters 110 may correspond to the area of a single pixel. Thus, to determine the color of an image in a single pixel could take 3 scanning steps, one for each subpixel. In an example where each subpixel corresponded to their own individual light emitting diode, then a calculation of incoming color per pixel could be done with a single scan for that pixel. Otherwise, each color filter may need a chance to be isolated in allowing light through so that it is clear which color component is coming through to a diode in the LED backlight 104.

In an example, a greyscale image may be able to be determined based on a pixel by pixel approach with all color filters left open at each filter. As each color filter would be open, the voltage value from incoming light could determine an intensity value for the light generally without attributing the resulting voltage to a particular color. This example may lead to identification of incoming light that can form a shape or image without color and may be determined in one-third the scanning steps.

In an example, a color filter may be set to a certain value for a first phase of a diode. For example, a diode emitting a certain shade of purple may include different values of red, green, and blue light. When a diode is no longer being driven to emit light, the diode may then become a photodiode in that incoming light on the diode can be converted to a voltage. In this instance, the last setting for the color filters, red, green, and blue, would be the setting for purple light. In this example, two approaches could be taken.

A first approach could be resetting the color filters to allow 100 percent of each color (e.g. green) through while blocking the other two (e.g. red and blue). In a second approach, the color filter values from purple would not be altered when the diode switches into a second phase where it is generating voltage in response to incoming light. The impact of this distinction is that when calculating an image value from the voltage generated, the element related to the color filter value would correspond to the setting of the particular filter. For example, if a green filter had a color filter value of 0.3 when emitting for purple light, rather than changing a color filter to 1.0 to allow all green light through, the color filter value may stay 0.3 when the diode is generating voltage for incoming light through the green color filter. This second approach reduces the need for color filter settings update which can reduce energy consumption, simplify programming, save time for switching color filter settings and still generate an image value for a pixel.

Figure 5:
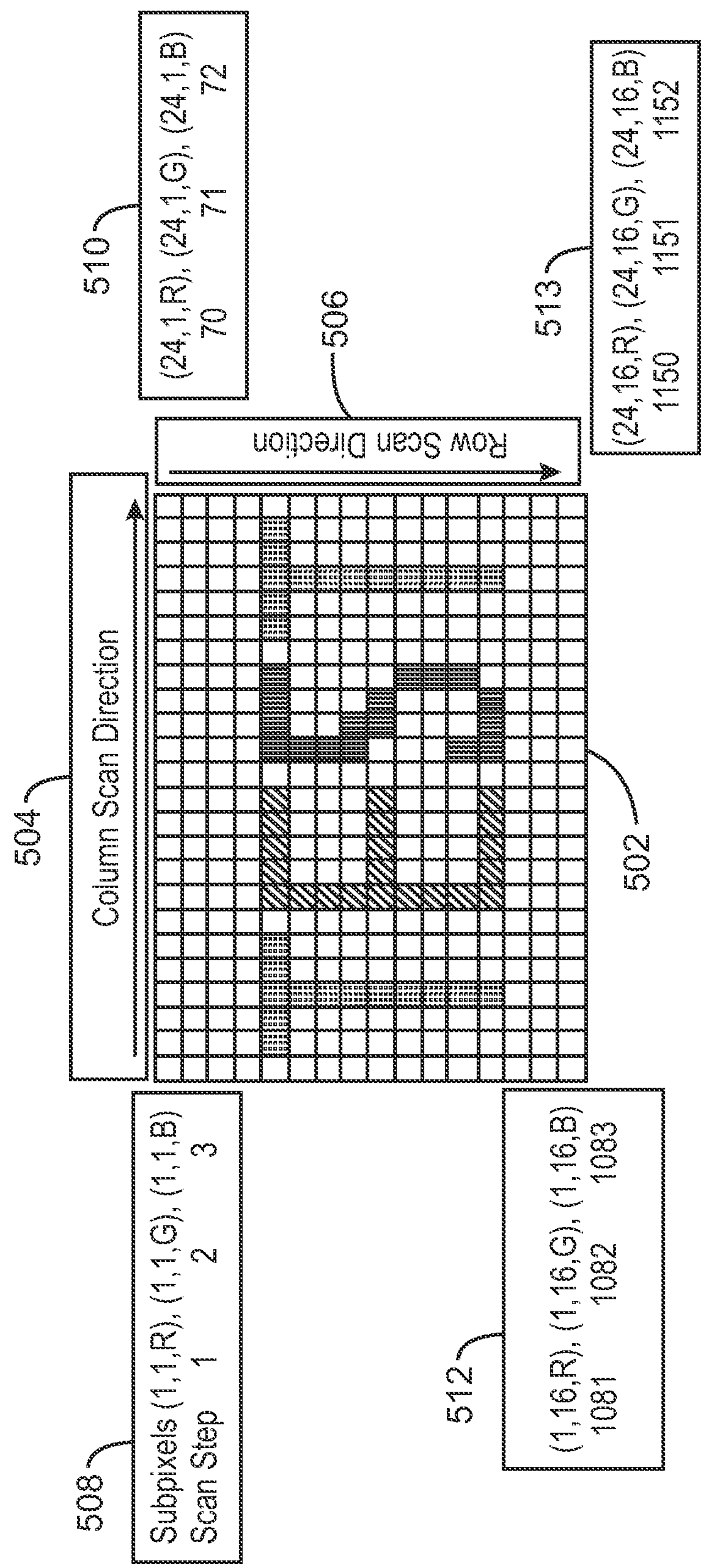
FIG. 5 is a schematic diagram showing an example scanning sequence of an LCD screen using optical input diodes.

FIG. 5 is a schematic diagram showing an example scanning sequence of an LCD screen using optical input diodes 500. As many LED backlights may not include a 1:1 ratio of diodes to pixels, identifying incoming light and colors may be done by checking the incoming light for a specific pixel one pixel at a time, one color filter at a time. In this example, knowing which pixel is being scanned enables an LED backlight to assume all incoming light has passed through the channel open in that single pixel. In an example, each pixel may be included of a number of subpixels or may be separated by color filters. In the example shown in FIG. 5, each pixel has three distinct color filters for each pixel, red, green, and blue. Accordingly, scanning a screen area 502 of incoming light to the LCD may be done pixel by pixel in a single column direction 504 and row direction 506.

As an example, the first pixel scan may take place in the upper-left corner of the screen area 502 with pixel on row 1, column 1. Further, this scan may be of a single subpixel corresponding to a red color filter in order to detect red light coming into this pixel. The notation for pixel 1 508 can be seen as (1, 1, R), (1, 1, G), then (1, 1, B). Each of these notations can refer to each step in scanning in order to get the R, G, and B light measured for pixel 1. This is similar to the process for FIG. 2-4 and can be performed for each pixel. The sequence can go systematically across the row until, in this example, the 24 pixel is reached.

The notation for pixel 24 510 can be seen as (24, 1, R), (24, 1, G), then (24, 1, B). Each of these notations can refer to each step in scanning the pixel in column 24, row 1, and each step for this pixel needed in order to get the R, G, and B light measured for pixel 24. Similar sequences can follow with row or column incremented and the next row or column scanned until each pixel and subpixel has been scanned. The notation for the pixel in column 1, row 16 is shown in box 512, and the notation for the pixel in column 24, row 16 is shown in box 513.

After scanning each pixel, an image can be generated for the time period over which the scanning took place. In this example, the image generated is the word “test” in a number of colors, a red “T”, a green “E”, a blue “S”, and a red “T” each indicated in FIG. 5 with various shading.

Figure 6:
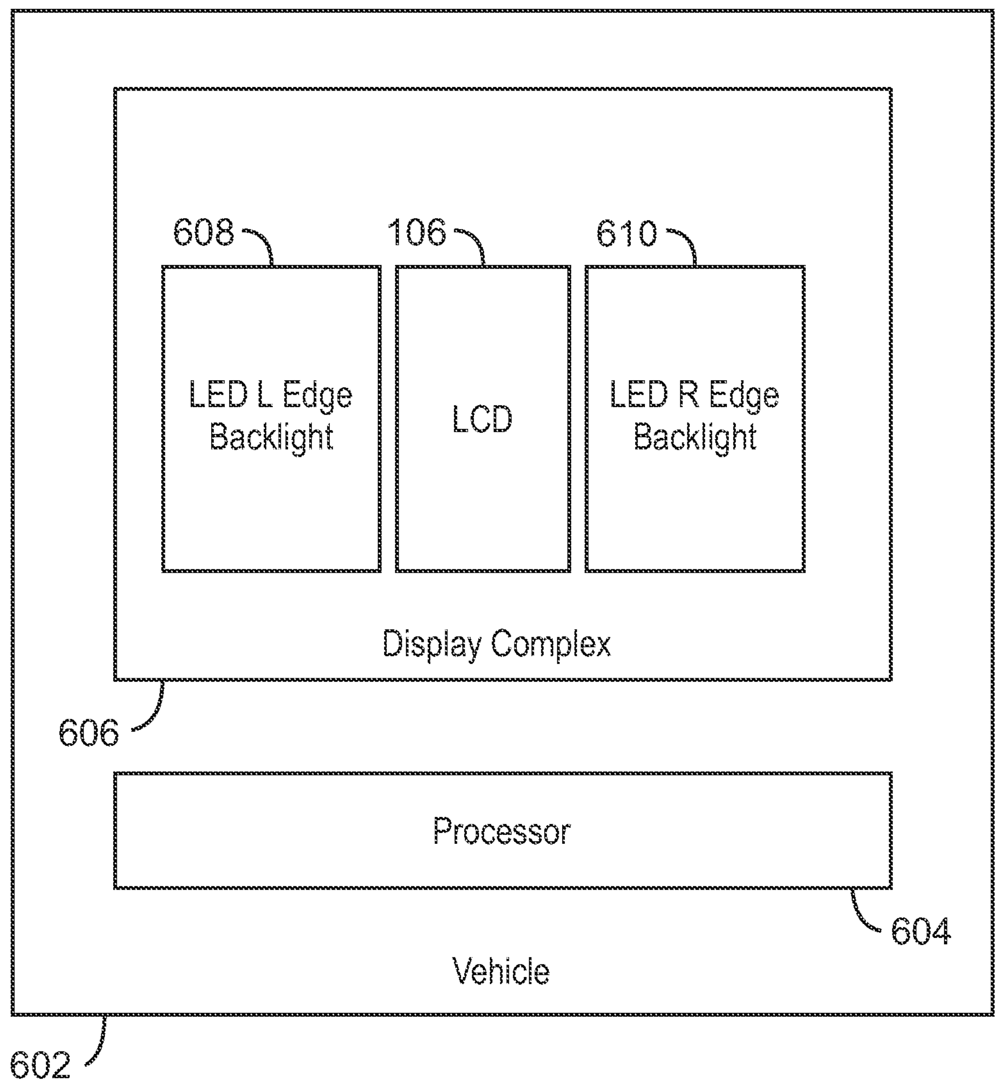
FIG. 6 is a schematic diagram of an example vehicle showing an example scanning sequence of an LCD screen using optical input diodes.

FIG. 6 is a schematic diagram of an example vehicle showing an example scanning sequence of an LCD screen using optical input diodes 600. Like numbered items are as described in FIG. 1.

The vehicle 602 may be an automobile or other vehicle that includes display screens such as an LCD 106. The vehicle 602 may include a processor 604 and a display complex 606 where information or entertainment is displayed to a driver or passenger of the vehicle 602. The display complex may have a LED left edge backlight 608 and a LED right edge backlight 610. In this example, each row for backlight is lit row by row using light sourced from both edge backlights and fed through a light transmitting layer through the LCD 106. In an example, the light transmitting layer is a film, substrate, glass, fibers, or other light guiding channel between the edge backlights and the LCD 106. During a scan for input light, a single pixel may be the only pixel in an area where light is allowed to transmit past the color filters. Furthermore, the combined total voltage for both edge backlights may be summed in order to determine a total throughput of incoming light into the backlight for voltage generation. Similarly, if the backlight were an array covering the area of the display rather than the edge, the voltages detected by each of the backlight LEDs could also be summed.

As light may only generate voltage for a subset or localized bank or group of LEDs, the scanning process could proceed in clusters at various intervals by row or column simultaneously in order to increase the speed of data gathering for an entire display screen. Similarly, for edge backlights, each may be checking for sums of voltages generated separated by a number of rows. This configuration in a vehicle 602 may enable the ability for an LCD screen in a car to detect a driver or passenger without the need of a camera device other than the input capabilities of the LCD screen itself. In an example, the voltage measuring and calculation for each pixel may occur in the display complex prior to reaching a vehicle processor 604. In an example, the voltages detected in a display complex can be processed at a vehicle processor 604.

Figure 7:
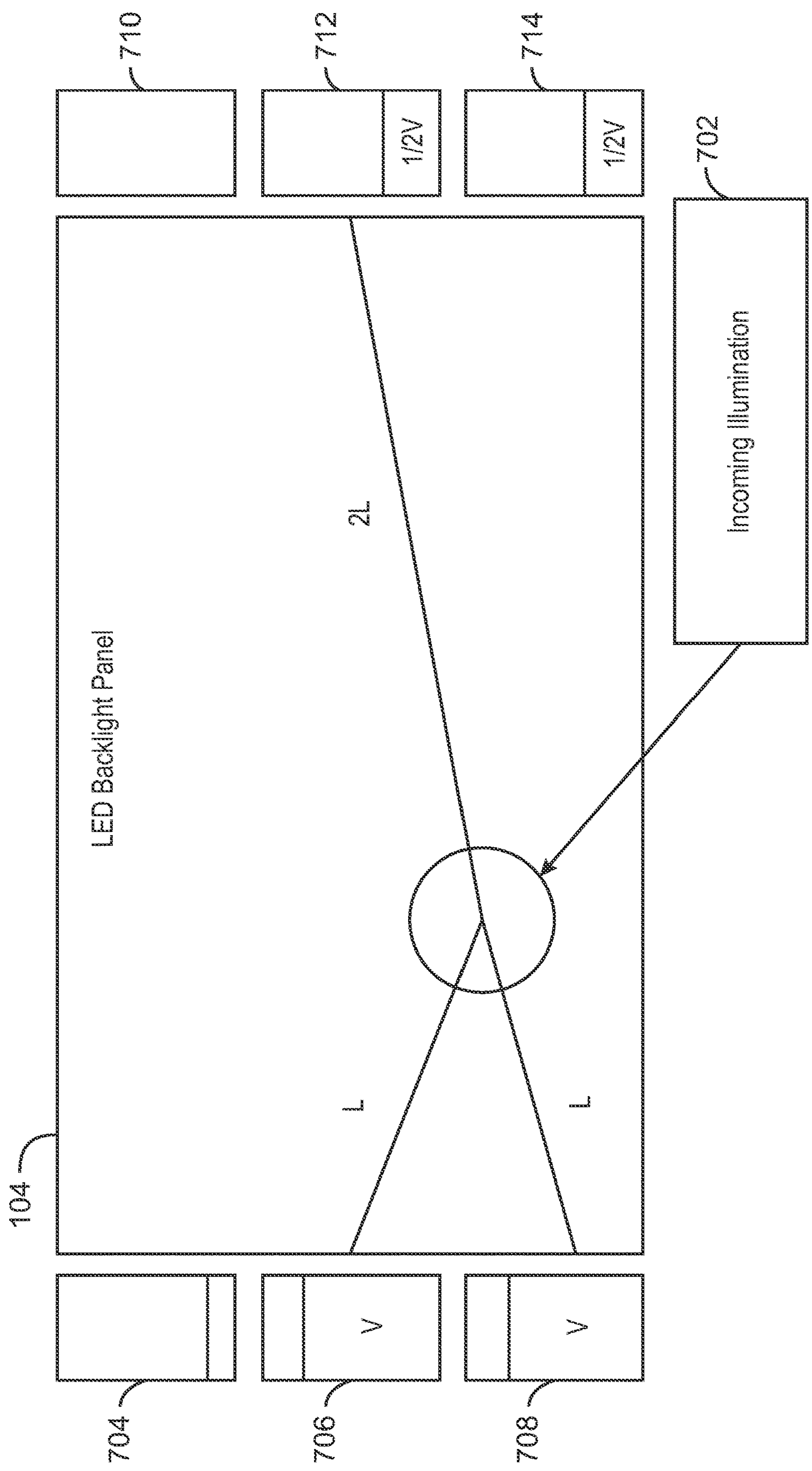
FIG. 7 is a schematic diagram for triangulating position for a source of light as detected by an LED backlight.

FIG. 7 is a schematic diagram 700 for triangulating position for a source of light as detected by an LED backlight. Like numbered items are as described with respect to FIG. 1.

In an example, an incoming illumination 702 may result in different voltages measured at multiple LED banks including LED bank 704, 706, 708, 710, 712, and 714. These LED banks may be part of an LED backlight panel or an LED edge backlight. Based on the relative voltages measured at each LED bank, a distance may be estimated from each bank detecting voltage. Furthermore, an area of overlap between multiple banks may be identified and projected to be the location of the illumination source.

In the example shown in FIG. 7, the voltage generated at LED Bank 706 and LED Bank 708 are equal, it is likely that the source is equidistant to LED Bank 706 and LED Bank 708. In this example, the voltage generated at LED Bank 712 is half the voltage of LED bank 706, that implies that the incoming illumination sources is twice as close to LED Bank 706 compared to LED Bank 712.

Using the different voltage differentials and comparing these voltage differentials in other LED banks can identify the illumination source's location. This location can use triangulation or intersection of distance estimates from voltage detections using LED backlight diodes in a way that converts incoming light to measured voltage.

Figure 8:
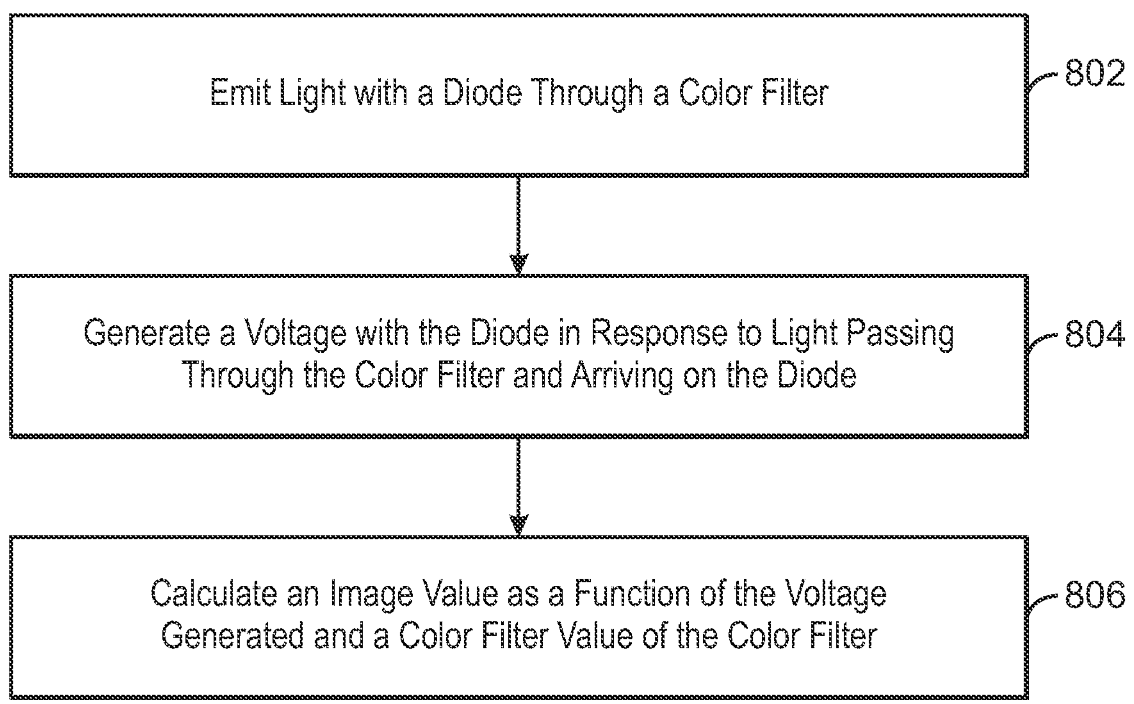
FIG. 8 is a process flow diagram of an example method for identifying optical input from a diode.

FIG. 8 is a process flow diagram of an example method 800 for identifying optical input from a diode. At block 802, the method 800 includes emitting light with a diode through a color filter. The method may also include detecting a voltage with a voltage detector connected in an electrical signal path between the diode and the processor. The diode for optical input may also be part of an LCD backlight system which is an edge backlight located along the edge of an LCD.

At block 804, the method 800 includes generating a voltage with the diode in response to light passing through the color filter and arriving on the diode. In an example, the diode emitting light through the color filter may be a first phase of the LCD backlight system, and the diode not emitting light through the color filter is a second phase of the LCD backlight system. In this example, the color filter blocks light passage for two of the red filter, green filter, or a blue filter in response to a diode entering a second phase from the first phase. In this example, the color filter blocks light passage for each two-filter combination of the red filter, green filter, and blue filter during the second phase. Further, the processor may record a voltage value for each combination to correspond to the color filter that is not blocked corresponding to the light arrived on the diode during the blocking period of each two-filter blocked combination.

In an example, the color filter value of the color filter for which light passage is not blocked as a result of entering the second phase, this color filter value is not changed in response to the diode entering the second phase from the first phase. The color filter value of the color filter for which light passage is not blocked may be changed to a color filter value that maximizes light passage through itself in response to the diode entering the second phase from the first phase.

At block 806, the method 800 includes calculating an image value as a function of the voltage generated and a color filter value of the color filter. In an example, the processor generates composite image value for the pixel from each of the color filter value's voltages and the respective voltages generated for each of the two-filter blocked combinations of the red filter, green filter, and blue filter.

In an example, the method may include a number of diodes including the diode, wherein the voltages generated by the number of diodes is summed for the pixel through which light is passing and the image value is calculated as a function of the summed voltage generated and a color filter value of the color filter through which light is permitted to travel. In this example, each diode in the number of diodes may be assigned to a distinct bank of diodes where each distinct bank of diodes has a known position in a display and the relative voltages measured in each distinct bank of diodes corresponds to a distance measure, and wherein the distance measure of each distinct bank of diodes can be used in combination with other distance measures to estimate the location of a light source.

While the invention may be susceptible to various modifications and alternative forms, specific embodiments have been shown by way of example. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A liquid crystal display (LCD) backlight device comprising:

a processor;

a color filter of a pixel comprising at least one of a red filter, a green filter, or a blue filter; and a diode to emit light through the color filter in response to being driven by the processor, the diode to generate a voltage in response to light passing through the color filter and arriving on the diode, where an image value is calculated as a function of the voltage generated and a color filter value of the color filter.

2. The device of claim 1, wherein the diode emitting light through the color filter is a first phase of operating the LCD backlight device, the diode not emitting light through the color filter is a second phase of operating the LCD backlight device, and the color filter blocks light passage for two of the red filter, the green filter, or the blue filter in response to the diode entering the second phase from the first phase.

3. The device of claim 2, wherein:

the color filter blocks light passage for each two-filter combination of the red filter, the green filter, and the blue filter during the second phase; and the processor records a voltage value for each two-filter blocked combination to correspond to the color filter that is not blocked corresponding to the light arrived on the diode during each two-filter blocked combination.

4. The device of claim 3, wherein the processor generates a composite image value for the pixel from each of the color filter value's voltages and the respective voltages generated for each of the two-filter blocked combinations of the red filter, the green filter, and the blue filter.

5. The device of claim 2, wherein the color filter value of the color filter for which light passage is not blocked as a result of entering the second phase, this color filter value is not changed in response to the diode entering the second phase from the first phase.

6. The device of claim 2, wherein the color filter value of the color filter for which light passage is not blocked is changed to a value that maximizes light passage through itself in response to the diode entering the second phase from the first phase.

7. The device of claim 1, comprising a voltage detector connected in an electrical signal path between the diode and the processor.

8. The device of claim 1, comprising a plurality of diodes including the diode, wherein the voltages generated by the plurality of diodes is summed for the pixel through which light is passing and the image value is calculated as a function of the summed voltage generated and the color filter value of the color filter through which light is permitted to travel.

9. The device of claim 8, wherein each diode in the plurality of diodes is assigned to a distinct bank of diodes where each distinct bank of diodes has a known position in a display and relative voltages measured in each distinct bank of diodes corresponds to a distance measure, and wherein the distance measure of each distinct bank of diodes can be used in combination with other distance measures to estimate a location of a light source.

10. The device of claim 1, wherein the LCD backlight device comprises at least one edge backlight located along the edge of an LCD.

11. A method for identifying optical input from a diode comprising:

emitting light with a diode through a color filter;

generating a voltage with the diode in response to light passing through the color filter and arriving on the diode; and calculating an image value as a function of the voltage generated and a color filter value of the color filter.

12. The method of claim 11, wherein the diode emitting light through the color filter is a first phase, the diode not emitting light through the color filter is a second phase, and the color filter blocks light passage for two of a red filter, a green filter, or a blue filter in response to the diode entering a second phase from the first phase.

13. The method of claim 12, comprising:

blocking, by the color filter, light passage for each two-filter combination of the red filter, the green filter, and the blue filter during the second phase; and recording a voltage value for each two-filter blocked combination to correspond to the color filter that is not blocked corresponding to the light arrived on the diode during each two-filter blocked combination.

14. The method of claim 13, comprising generating a composite image value for a pixel from each of the color filter value's voltages and the respective voltages generated for each of the two-filter blocked combinations of the red filter, green filter, and blue filter.

15. The method of claim 11, comprising measuring the voltage generated by the diode with a voltage detector connected in an electrical signal path between the diode and a processor.

16. The method of claim 11, wherein the diode is located in an edge backlight located along an edge of an LCD.

17. A system for identifying an image with diodes comprising:

a processor;

a liquid crystal display (LCD);

a light emitting diode backlight array;

a color filter of a pixel comprising at least one of a red filter, a green filter, or a blue filter; and a diode in the light emitting diode backlight array to emit light through the color filter in response to being driven by the processor, the diode to generate a voltage in response to light passing through the color filter and arriving on the diode, where an image value is calculated as a function of the voltage generated and a color filter value of the color filter.

18. The system of claim 17, wherein the diode emitting light through the color filter is a first phase of operating the system, the diode not emitting light through the color filter is a second phase of operating the system, and the color filter blocks light passage for two of the red filter, the green filter, or the blue filter in response to the diode entering the second phase from the first phase.

19. The system of claim 17, comprising a voltage detector connected in an electrical signal path between the diode and the processor.

20. The system of claim 17, wherein the diode voltage is generated in response to light passing through the color filter while red, green, and blue subpixels of one or more pixels are active at the same time so that a greyscale image value is calculated as a function of the voltage generated and color filter values of the color filter.

* * * * *